Aug. 23, 1927.  
J. W. FAY  
1,639,652  
METHOD OF AND MEANS FOR FORMING COMPOSITE ARTICLES  
Filed July 9, 1924   3 Sheets-Sheet 3
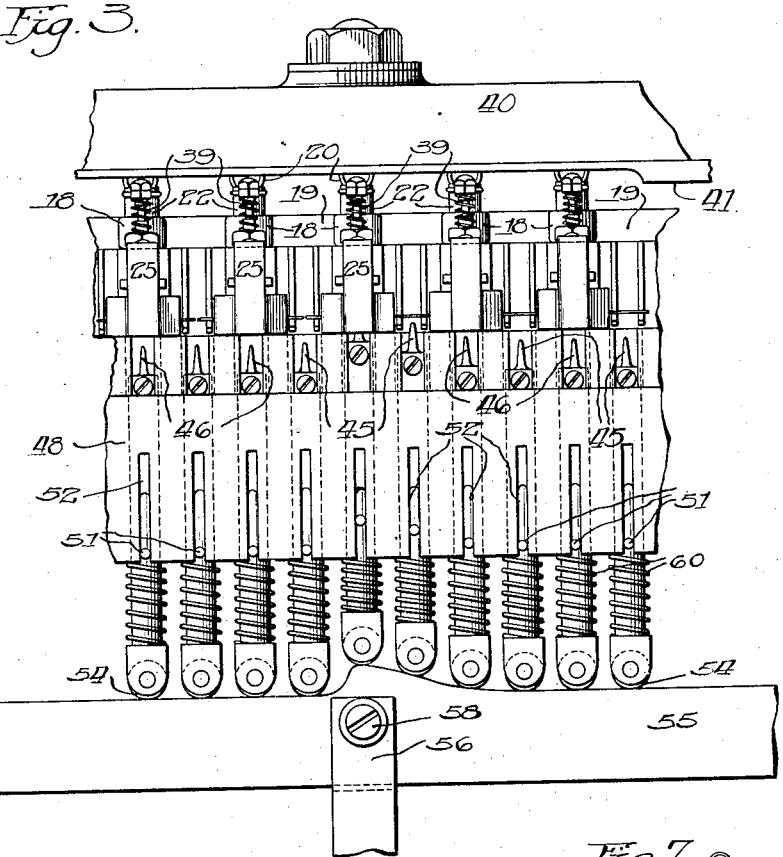
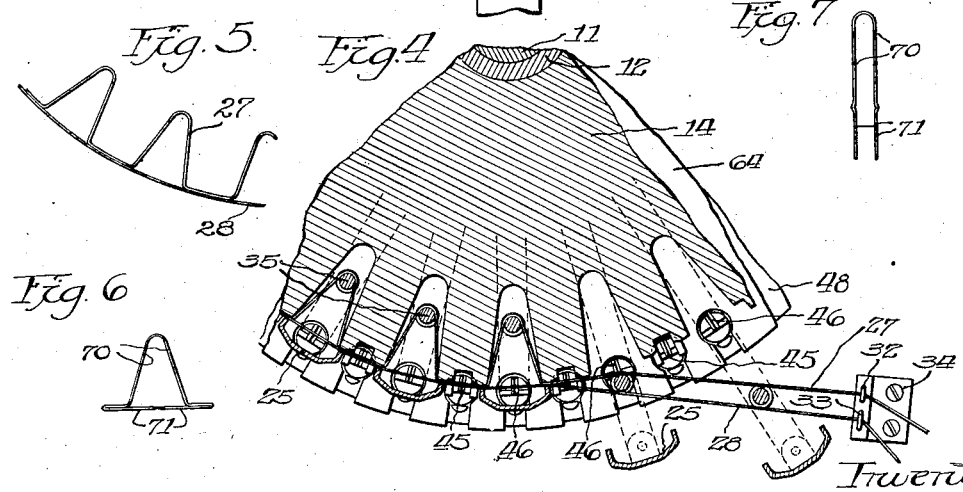

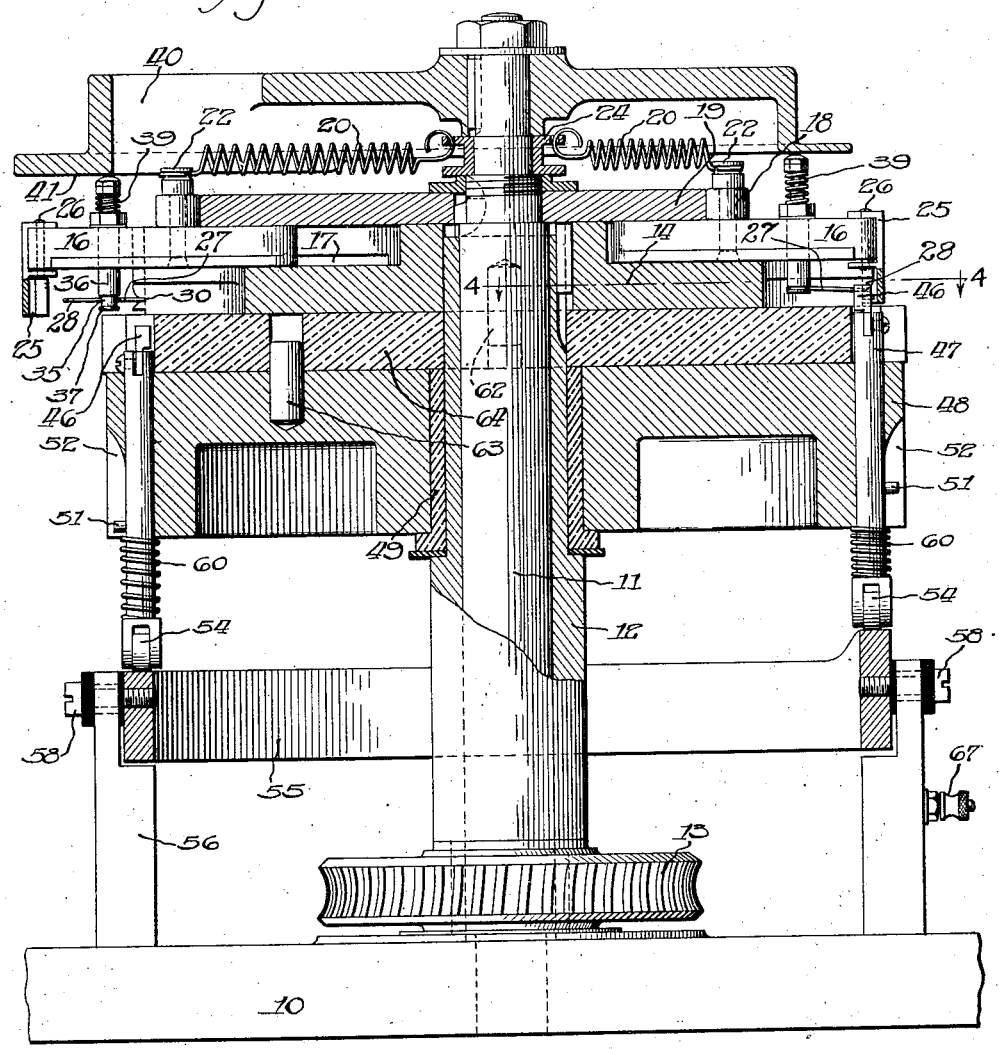

Patented Aug. 23, 1927.

1,639,652

UNITED STATES PATENT OFFICE.

JOSEPH WILLIAM FAY, OF VILLA PARK, ILLINOIS, ASSIGNOR TO WESTERN ELECTRIC COMPANY, INCORPORATED, OF NEW YORK, N. Y., A CORPORATION OF NEW YORK.

METHOD OF AND MEANS FOR FORMING COMPOSITE ARTICLES.

Application filed July 9, 1924. Serial No. 725,044.

This invention relates to a method of and means for forming composite articles, and more particularly to a method of and means for forming composite articles comprising elements fused or welded to each other.

The primary object of the invention is to provide a method and means whereby composite articles comprising elements which are fused to each other and are of uniform quality and dimensions can be produced with a minimum of manual labor and supervision.

In one embodiment of the invention, the improved method is practiced in connection with apparatus for producing assemblies of the lead-in and mount wires of electric lamps of the type shown and described in the copending application of R. A. Price, Serial No. 713,461, filed May 15, 1924, which assemblies comprise a length of wire, to the ends of which are fused two wires having characteristics different than those of the central wire, the central wire being of sufficient length to form two mount wires, and the end wires being lead-in wires of proper length.

The apparatus comprises means for producing the assemblies from continuous strands of wire having the proper characteristics. The wires are subjected to an electrical current which fuses the end portions of a section, which is to be formed into mount wires, to the end portions of a section, which is to be formed into lead-in wires, and severs the sections from the strands. The electrical current also fuses the lead-in wire section in such manner that it is severed intermediate its ends.

Other objects and features of the invention will become apparent as the detailed description progresses, reference being had to the accompanying drawings, wherein Fig. 1 is a plan view of apparatus embodying the invention;

Fig. 2 is a sectional view taken on line 2—2 of Fig. 1;

Fig. 3 is a fragmentary side elevation view of the apparatus shown in Figs. 1 and 2, the view being developed through illustrated details of construction;

Fig. 4 is a sectional view taken on line 4—4 of Fig. 2;

Fig. 5 is a diagrammatic view illustrating the manner in which the apparatus is adapted to form assemblies of the lead-in and mount wires of electric lamps of the type shown in the aforementioned copending application;

Fig. 6 shows a completed assembly of the lead-in and mount wires; and

Fig. 7 shows the form imparted to the assemblies when they are assembled with the stems of the lamps.

Figure 1:
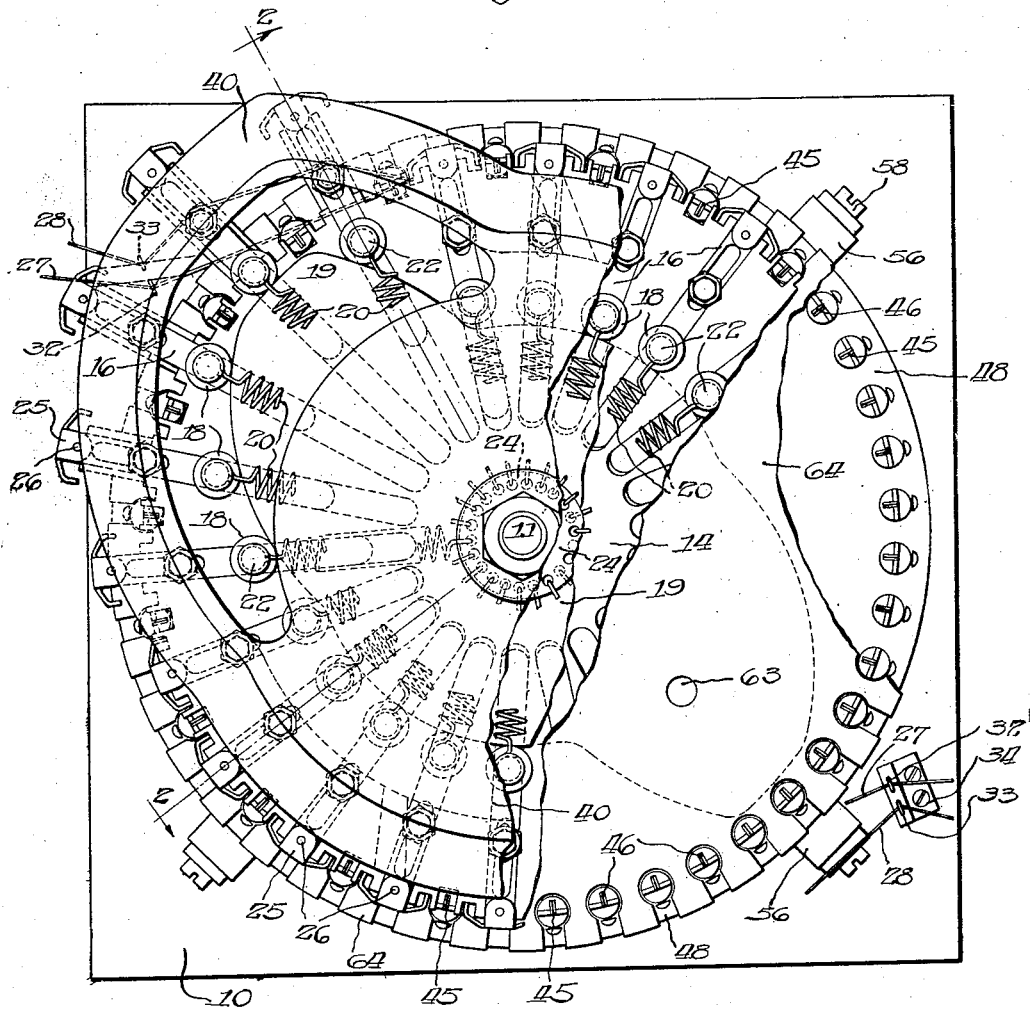

It is believed that a complete understanding of the improved method will be had from a description of the apparatus by which the method is practiced.

The apparatus shown in the accompanying drawings is adapted to form a plurality of the above described assemblies of lead-in and mount wires simultaneously, completed assemblies being simultaneously discharged from opposite sides of the apparatus at equal intervals of time during the operation thereof.

Referring to the drawings, the reference character 10 designates a base upon which the improved apparatus is mounted. A vertically disposed stud shaft 11 rigidly secured to the base 10 rotatably journals a metallic sleeve 12 which has a worm gear 13 secured to it at its lower end. Suitable means (not shown) is provided for driving the worm gear 13 and it in turn drives the sleeve 12 and a metallic disc 14 keyed to the sleeve at the upper end thereof.

A plurality of slides 16 are mounted in ways 17 formed in the disc 14, the ways being radially disposed with respect to the axis of the stud shaft 11. Each slide 16 is provided with an anti-friction roller 18 yieldingly held in engagement by a tension spring 20 with a cam 19 keyed to the stud shaft 11. The tension springs 20 are also radially disposed with respect to the axis of the stud shaft 11 and the outer ends of the springs are secured to pins 22 which secure the rollers 18 to the slides 16, the inner ends of the springs being fastened to a collar 24 rotatably journaled upon the stud shaft 11.

Pivotally secured to the outer end of each slide 16 is a clamping member 25, a plurality of pins 26 being provided for this purpose. As best shown in Figs. 1 and 4, the cam 19 and the tension springs 20 are adapted to bring the slides 16 into and out of positions wherein the clamping members 25 may clamp a plurality of wires 27 and 28 against the disc 14, the disc 14 being provided with a plurality of aligned grooves 30 to receive spaced portions of the wires. It is obvious that when the disc 14 is rotated, the wires 27 and 28 will be withdrawn from any suitably positioned sources of supply. In practice each wire is supplied upon reels (not shown) the wires being guided into the grooves 30 by means of a plurality of eyes 32 and 33 which are supported by brackets 34. A wire 27 and a wire 28 are provided for each side of the apparatus so that it may form a plurality of assemblies simultaneously.

When the machine is in operation sections of each wire 27 will be aligned with sections of one of the wires 28 in such manner that the end portions of each section of one wire will be disposed in close proximity to the end portions of a section of the other wire. The apparatus is so arranged that the sections obtained from the wire 27 will be of greater length than the sections obtained from the wire 28, the wires 27 and 28 being employed to form the mount wires and the lead-in wires respectively of the electric lamps of the aforementioned type. It is, of course, understood that the lead-in wires of electric lamps are made as short as possible because of the comparatively high cost of the material from which they are manufactured.

The length of the sections formed from the wire 27 are gauged by mechanism comprising a plurality of vertically disposed pins 35 slidably journaled in a plurality of sleeves 36 carried by the slides 16 and adapted to draw predetermined lengths of the wires 27 with them when the slides are brought into their retracted positions by the springs 20 thus forming loop sections in the wires 27, as clearly indicated in Figs. 4 and 5.

The pins 35 are provided with heads 37 at their lower ends which are adapted to cooperate with the lower ends of the sleeves 36 to clamp portions of the wires 27 between them when the sections have been correctly positioned in the apparatus. Each pin 35 is provided with a compression spring 39 adapted to urge its head 37 into a position wherein the head will clamp a portion of a wire 27 against the lower end of the sleeve 36 wherein the pin is slidably journaled. At certain points in each revolution of the disc 14, this tendency of the springs 39 is overcome by a cam 40 which is keyed to the upper end of the stud shaft 11, the cam 40 being provided with two diametrically disposed dwells 41 adapted to depress the pins 35 against the action of the springs 39. The purpose of this construction will presently appear.

The aforementioned cam 19 is adapted to bring the slides 16 into their outermost positions at two diametrically disposed points during each revolution of the disc 14. The wires 27 and 28 are drawn into the apparatus at these points in such manner that the clamping members 25 will clamp the wires in the grooves 30 when the slides 16 are brought into their retracted positions by the springs 20. The clamps 25 and the pins 35 position the sections of the wires 27 and 28 in the manner diagrammatically illustrated in Fig. 5, the end portions of each section of wire 27 being disposed alongside of the end portions of a section of wire 28.

Means comprising a plurality of carbon electrodes 45 is provided for subjecting the end portions of the sections to an electric current which is of sufficient amplitude to fuse the end portions to each other and to sever the sections adapted to form one assembly from the sections adapted to form the following assembly. This means also comprises a plurality of carbon electrodes 46 employed to fuse each section of the wire 28 in such manner that the section is severed intermediate its ends. The carbon electrodes 45 and 46 are substantially identical in form and are secured to the upper ends of a plurality of vertically disposed push rods 47. The push rods 47 are slidably journaled in the metallic disc 48 which is rotatably journaled upon an insulating sleeve 49 disposed around the sleeve 12. Each push rod 47 is held against rotation about its own axis by means of a pin 51 projecting from the push rod and riding in one of a plurality of slots 52 formed in the metallic disc 48. The lower ends of the push rods 47 are provided with anti-friction rollers 54 adapted to ride upon a cam 55 rigidly secured to a plurality of posts 56 projecting from the base 10. The cam 55 is secured to the posts 56 by means of a plurality of cap screws 58 which are insulated from the posts 56 in any suitable manner. A helical compression spring 60 is provided for each push rod 47, the helical spring 60 being adapted to hold the anti-friction roller 54 of the push rod in engagement with the cam 55. The metallic disc 48 is rotated in unison with the metallic disc 14 through the medium of a plurality of dowel pins 62 and 63 which operatively connect the metallic discs 14 and 48, respectively, with an insulating disc 64 interposed between the metallic discs 14 and 48 and rotatably journaled upon the sleeve 12.

The cam 55 is designed to raise the push rods 47 at two diametrically disposed points during each revolution of the discs 14 and 48. When the push rods 47 which carry the carbon electrodes 45 are raised, the carbon electrodes 45 are brought into engagement with those portions of the wires 27 and 28 disposed intermediate the clamping members 25 at the point which marks the end of one assembly and the beginning of another. The carbon electrodes 45 are connected to a suitable source (not shown) of electrical energy through the push rods 47, the cam 55 and one of the cap screws 58 which serves as a binding post, this cap screw 58 being connected by any suitable conductor (not shown) to the source of electrical energy. One of the posts 56 is provided with a binding post 67 which is also suitably connected to the source of electrical energy. It is readily understood that when a carbon electrode 45 engages the wires 27 and 28 the current will flow from the source of electrical energy through the electrode 45 by way of its push rod 47 through end portions of sections of the wires 27 and 28 and then return through adjacent clamping members 25, slides 16, the metallic disc 14, the stud shaft 11, the base 10 and the binding post 67 to the source of electrical energy. In a like manner the carbon electrodes 46 subject sections formed from the wire 28 to an electric current obtained from the same source when the posts 47 operating these carbon electrodes are raised by the cam 55. In each instance the current through which the wire 28 or the wires 27 and 28 are subjected is sufficient to fuse and sever the wire or wires.

In the operation of the apparatus, the outer ends of a plurality of wires 27 and 28 carried upon suitable supply reels (not shown) are threaded through the eyes 32 and 33, respectively, and properly clamped underneath one or more of the clamping members 25. The apparatus is then set in operation and as the metallic discs 14 and 48 rotate the pins 35 will continuously gauge the length of the section formed from the wire 27, and thereafter the clamping members 25 will continuously align sections of each wire 27 with shorter sections of one of the wires 28. The aligned sections are advanced to the points where the cam 55 raises the push rods 47. As a pair of aligned sections from two of the wires 27 and 28 pass one of these points, the forward ends of the sections are first fused together by means comprising one of the carbon electrodes 45. Then that section which has been obtained from a wire 28 is fused in such manner as to sever it intermediate its ends and then the remaining ends of the aligned sections are fused to each other and severed from the following sections. The completed assemblies are discharged from the appartus by means of the mechanism comprising the posts 37, the cam 40 being designed to allow the head portions 37 of the posts 35 to clamp the central portions of the sections of the wires 27 against the lower ends of the sleeves 36 when the sections have been properly formed in the apparatus. When the slides 16 are driven outwardly by the cam 19 the sections clamped by the heads 37 and the sleeves 36 are carried with the slide. The dwell 41 of the cam 40 then functions to depress the pins 35 against the action of the springs 39 and the completed assemblies drop from the apparatus.

The completed assemblies, when discharged from the machine, appear as is shown in Fig. 6 wherein the reference character 70 designates the section adapted to form two mount wires, the lead-in wires being indicated at 71. The assembly is drawn into the form shown in Fig. 7, when it is secured to the stem of the electric lamp, the mount wire section being severed after the assembly has been secured to the stem.

What is claimed is:

1. The method of forming composite articles, which consists in causing a plurality of wires to contact with each other at spaced points, subjecting said wires at the engaged points to an electric current to cause them to be fused together, and simultaneously therewith subjecting one of said wires to an electric current for severing it intermediate its ends.

2. The method of forming composite articles, which method consists in fusing one end of an element to one end of a second element, then severing one element intermediate its ends, and then fusing the other end of the first-mentioned element to the other end of the second element.

3. The method of forming composite articles, which method consists in fusing a portion of an element to a portion of a second element, then severing the second element intermediate its ends, and then fusing a second portion of the first-mentioned element to a second portion of the second element in such manner that the severed portion of the second element is disposed intermediate said fused portions thereof.

4. The method of forming composite articles, which method consists in fusing one end of an element to one end of a second element, then fusing the second element in such manner as to sever it intermediate its ends, and then fusing the other end of the first-mentioned element to the other end of the second element.

5. The method of forming composite articles, which method consists in fusing a portion of an element to a portion of a second element, then fusing a portion of the second element in such manner that it is severad intermediate its ends, and then fusing a second portion of the first-mentioned element to a second portion of the second element in such manner that the severed portion of the second element is disposed intermediate the fused portions thereof.

6. The method of forming an article comprising an intermediate portion fused to the end portions thereof, which method consists in fusing one end of a predetermined length of wire to one end of a second predetermined length of wire, then severing the second wire intermediate its ends, and then fusing the other end of the first-mentioned length of wire to the other end of the second length of wire.

7. The method of forming an article comprising an intermediate portion fused to the end portions thereof, which method consists in fusing one end of a predetermined length of wire to one end of a second predetermined length of wire, then fusing the second length of wire to sever it intermediate its ends, and then fusing the other end of the first-mentioned length of wire to the second length of wire.

8. The method of forming an article comprising an intermediate portion fused to the end portions thereof, which method consists in fusing one end of a continuous strand of material to one end of a second continuous strand of material, then severing said second strand at a point spaced from said end thereof, and then fusing an intermediate portion of the first-mentioned strand to an intermediate portion of the second strand in such manner as to sever the strands.

9. The method of forming an article comprising an intermediate portion fused to the end portions thereof, which method consists in fusing one end of a continuous strand of material to one end of a second continuous strand of material, then fusing said second strand at a point spaced from said end thereof to sever the strand, and then fusing an intermediate portion of the first-mentioned strand to an intermediate portion of the second strand in such manner as to sever the strands.

10. The method of forming composite articles from a plurality of lengths of metal strand, which consists in forming a loop in one of the lengths of strand, positioning spaced portions at either side of the loop in one length in engagement with spaced portions of the other length, subjecting the engaged portions of the lengths to an electric current in such manner that they are fused to each other, and severing one of the lengths intermediate its ends by subjecting it to an electric current.

11. The method of forming composite articles which consists in advancing a plurality of wires, bending one of the wires, causing the engagement of the wires, subjecting the engaged portions of the wires to an electric current to fuse one wire to the other, and causing the severance of the wires at such point.

12. The method of forming composite articles which consists in advancing a plurality of wires, forming a loop in one of the wires during such advancement, enclosing said loop portion by causing the engagement of the wires at spaced intervals, and subjecting portions of the engaged wires to an electric current to fuse one wire to the other.

13. The method of forming composite articles which consists in forming open loops in one wire, closing the loops by another wire, subjecting the wires intermediate the loops to an electric current to sever them from the remaining portions of the wires and weld the ends of the severed wires.

14. The method of forming composite articles which consists in continuously advancing a plurality of wires, forming open loops in one of the wires, closing each open loop with another wire, and subjecting the wires intermediate adjacent loops to an electric current to weld and sever the wires from the remaining portions of the wires.

15. Apparatus for forming composite articles, comprising means for holding spaced portions of a piece of stock in close proximity to spaced portions of a second piece of stock, means for fusing the spaced portions on one piece of stock to the spaced portions on the other piece of stock in such manner that each piece of stock is severed from the remaining portions thereof, and means for severing one of said pieces of stock intermediate said spaced portions thereof.

16. Apparatus for forming composite articles, comprising means for holding spaced portions of a piece of stock in close proximity to spaced portions of a second piece of stock, means for fusing the spaced portions on one piece of stock to the spaced portions on the other piece of stock in such manner that each piece of stock is severed from the remaining portions thereof, and means for fusing one of said pieces of stock in such manner as to sever it intermediate said spaced portions thereof.

17. Apparatus for forming composite articles, comprising means for withdrawing a plurality of lengths of stock from a plurality of supplies thereof, means for fusing spaced portions of one of said lengths of stock to spaced portions of the other in such manner as to sever said lengths of stock from the supplies thereof, and means for severing one of said spaced lengths of stock intermediate the spaced portions thereof.

18. Apparatus for forming composite articles, comprising means for withdrawing a plurality of lengths of stock from a plurality of supplies thereof, means for fusing spaced portions of one of said lengths of stock to spaced portions of the other in such manner as to sever said lengths of stock from the supplies thereof, and means for fusing a portion of one of said lengths of stock in such manner as to sever it intermediate said spaced portions thereof.

19. Apparatus for forming composite articles comprising means for fusing a wire to another wire at spaced points, means for severing one of said lengths of wire intermediate said points, and means for actuating the several aforementioned means in timed relation.

20. Apparatus for forming composite articles, comprising means for withdrawing predetermined lengths of stock from a plurality of supplies thereof, means for fusing one of said lengths of stock to the other, and means for fusing a portion of one of said lengths of stock so as to sever it intermediate its ends.

21. Apparatus for forming composite articles comprising means for holding spaced portions of a piece of stock in close proximity to spaced portions of a second piece of stock, means for forming a loop in one piece of stock, means for positioning spaced portions of one piece of stock in engagement with spaced portions of the other piece of stock, means for fusing the pieces of stock to each other at the engaged points thereof in such manner that the free end of each piece of stock is severed, means for severing the second piece of stock intermediate the points thereof fused to the other piece of stock, and means for actuating the several aforementioned means in timed relation.

22. Apparatus for forming composite articles comprising means for withdrawing a plurality of lengths of stock, means for forming loops in one length of stock, means for fusing spaced portions thereof at either side of the loop to spaced portions of the other length of stock in such manner as to sever the free end of said lengths of stock, and means for severing one of said lengths of stock intermediate the spaced portions thereof.

23. Apparatus for forming composite articles comprising means for holding spaced portions of a piece of stock in close proximity to spaced portions of a second piece of stock, means for forming a loop in one of the pieces of stock, means for fusing spaced portions thereof at either side of the loop to spaced portions of the other piece of stock in such manner that the free end of each piece of stock is severed, and means for severing one of said pieces of stock intermediate the spaced portions thereof.

24. Apparatus for forming composite articles comprising means for forming a loop in a predetermined length of stock, means for fusing spaced portions thereof at either side of the loop to spaced portions of a second predetermined length of stock, means for severing one of said lengths of stock at a point between the sides of the loop, and means for actuating the several aforementioned means in timed relation.

25. Apparatus for forming composite articles comprising means for arranging and holding in parallelism spaced portions of a piece of stock in close proximity to spaced portions of a second piece of stock, means for fusing the spaced portions on one piece of stock to the spaced portions on the other piece of stock in such manner that the free end of each piece of stock is severed, and means for severing one of said pieces of stock intermediate said spaced portions thereof.

26. Apparatus for forming composite articles comprising means for holding spaced portions of a piece of stock in close proximity to spaced portions of a second piece of stock, means for forming a loop in one piece of stock, means for positioning spaced portions of one piece of stock in engagement with spaced portions of the other piece of stock, the spaced portions of one piece of stock being disposed parallel to the spaced portions of the other piece of stock, means for fusing the pieces of stock to each other at the engaged points thereof in such manner that the free end of each piece of stock is severed, and means for severing the second mentioned piece of stock intermediate the points thereof fused to the other piece of stock.

27. In an apparatus for forming composite articles, means for assembling from separate sources of supply wires of different characteristics in contacting relation, means for applying electric current to the wires at the points of engagement for fusing them together, and means for severing one of the wires intermediate the engaged points whereby predetermined lengths of one kind of wire are secured at opposite ends of the other wire.

28. The process of forming composite articles, which consists in bringing together wires of different composition so that they engage with each other at spaced points, subjecting the wires at such points to an electric current to cause them to be fused to each other, and severing one of said wires intermediate said fused places.

In witness whereof, I hereunto subscribe my name this 28 day of June A. D., 1924.

JOSEPH WILLIAM FAY.